United States Patent
Lefebvre et al.

(10) Patent No.: US 11,235,225 B2
(45) Date of Patent: Feb. 1, 2022

(54) SKATE WITH INJECTED BOOT FORM

(71) Applicant: BAUER HOCKEY, LLC, Exeter, NH (US)

(72) Inventors: Marc Andre Lefebvre, Taichung (TW); Aky Hung, Taichung (TW); Dmitry Rusakov, Van Nuys, CA (US)

(73) Assignee: BAUER HOCKEY LLC, Exeter, NH (US)

( * ) Notice: Subject to any disclaimer, the term of this patent is extended or adjusted under 35 U.S.C. 154(b) by 8 days.

(21) Appl. No.: 16/537,892

(22) Filed: Aug. 12, 2019

(65) Prior Publication Data

US 2020/0047057 A1 Feb. 13, 2020

Related U.S. Application Data

(63) Continuation of application No. 15/874,625, filed on Jan. 18, 2018, now Pat. No. 10,413,804, which is a (Continued)

(51) Int. Cl.
*A43B 5/16* (2006.01)
*A63C 1/00* (2006.01)
(Continued)

(52) U.S. Cl.
CPC .............. *A63C 1/00* (2013.01); *A43B 5/0496* (2013.01); *A43B 5/1625* (2013.01);
(Continued)

(58) Field of Classification Search
CPC ... A43B 5/0496; A43B 5/1625; A43B 5/1666; A43B 5/1691; A43B 23/025; A63C 1/00; A63C 1/42

See application file for complete search history.

(56) References Cited

U.S. PATENT DOCUMENTS

| 41,694 A | 2/1864 | Getty |
|---|---|---|
| 61,998 A | 2/1867 | Bushman |

(Continued)

FOREIGN PATENT DOCUMENTS

| CA | 1190571 | 7/1985 |
|---|---|---|
| CA | 2292995 | 6/2000 |

(Continued)

OTHER PUBLICATIONS

European Search Report dated Jul. 24, 2014, in connection with European Patent Application No. 14158831.9, 6 pages.

(Continued)

*Primary Examiner* — Ted Kavanaugh

(57) ABSTRACT

A boot form for a hockey skate is made of multiple plastic materials having different hardness properties, or different flexural moduli, and is formed via an injection-molding process or another similar process. One or more of the plastic materials may be reinforced with fibers of glass, carbon, aramid, or another stiffening material to strengthen one or more regions of the boot form. For example, pellets of a first plastic material having a flexural modulus of approximately 190 MPa (e.g., a polyamide elastomer block amide) may be injected into a mold to form a softer upper region of the boot form. And pellets of a second plastic having a flexural modulus of approximately 20,000 MPa (e.g., a Nylon 12 with long glass fibers) may be injected into the mold to form a stiffer lower region of the boot form. Additional skate components may then be attached to the boot form.

20 Claims, 3 Drawing Sheets

Related U.S. Application Data continuation of application No. 14/094,599, filed on Dec. 2, 2013, now Pat. No. 9,878,229, which is a continuation-in-part of application No. 13/794,071, filed on Mar. 11, 2013, now Pat. No. 9,510,639.

(51) Int. Cl.
*A63C 1/42* (2006.01)
*B29D 35/04* (2010.01)
*A43B 5/04* (2006.01)
*A43B 23/02* (2006.01)
*B29D 35/00* (2010.01)

(52) U.S. Cl.
CPC .......... *A43B 5/1666* (2013.01); *A43B 5/1691* (2013.01); *A43B 23/025* (2013.01); *A63C 1/42* (2013.01); *B29D 35/0009* (2013.01); *B29D 35/0054* (2013.01); *B29D 35/04* (2013.01)

(56) References Cited

U.S. PATENT DOCUMENTS

| | | |
|---|---|---|
| 275,482 A | 4/1883 | Gregg |
| 439,161 A | 10/1890 | Krause |
| 703,828 A | 7/1902 | Read |
| 1,598,504 A | 8/1926 | Pierce |
| 1,832,866 A | 11/1931 | Johnson |
| 2,211,822 A | 8/1940 | Jennings |
| 2,230,553 A | 2/1941 | Weisman |
| 2,563,763 A | 8/1951 | Vietas |
| 2,617,207 A | 11/1952 | Jennett |
| 2,789,374 A | 4/1957 | Planert |
| 2,918,734 A | 12/1959 | Hyde |
| 3,235,978 A | 2/1966 | Hyde |
| 3,243,191 A | 3/1966 | Weisman |
| 3,668,793 A | 6/1972 | Stohr et al. |
| 3,729,841 A | 5/1973 | Wagner |
| 3,807,062 A * | 4/1974 | Spier ............ A43B 1/0018 36/117.2 |
| 4,072,317 A | 2/1978 | Pommerening |
| 4,107,856 A | 8/1978 | Bourque |
| 4,222,184 A | 9/1980 | Kastinger |
| 4,280,286 A | 7/1981 | Santor |
| 4,351,537 A | 9/1982 | Seidel |
| 4,384,413 A | 5/1983 | Bourque |
| 4,453,727 A | 6/1984 | Bourque |
| 4,509,276 A * | 4/1985 | Bourque ............ A43B 5/1683 36/115 |
| 4,561,196 A | 12/1985 | Petrini et al. |
| 4,615,127 A | 10/1986 | Delery |
| 4,655,465 A | 4/1987 | Schaeffer |
| 4,773,658 A | 9/1988 | Bourque et al. |
| 4,835,885 A | 6/1989 | Hoshizaki et al. |
| 4,865,023 A | 9/1989 | Craythorne et al. |
| 4,869,001 A | 9/1989 | Brown |
| 4,901,455 A | 2/1990 | Morell et al. |
| 4,964,229 A | 10/1990 | Laberge |
| 5,016,623 A | 5/1991 | Krahenbuhl |
| 5,050,620 A | 9/1991 | Cooper |
| 5,072,529 A | 12/1991 | Graf |
| 5,090,138 A | 2/1992 | Borden |
| D324,447 S | 3/1992 | Purdom |
| 5,171,033 A | 12/1992 | Olson et al. |
| 5,210,963 A | 5/1993 | Harwood |
| 5,255,929 A | 10/1993 | Lemelson |
| 5,272,823 A | 12/1993 | Perrissoud |
| 5,295,316 A | 3/1994 | Bergamin |
| 5,329,705 A | 7/1994 | Grim et al. |
| 5,342,070 A * | 8/1994 | Miller ............ A43B 23/087 280/11.231 |
| 5,397,141 A | 3/1995 | Hoshizaki et al. |
| 5,400,529 A | 3/1995 | Bell et al. |
| 5,406,721 A | 4/1995 | Marcolin |
| 5,408,763 A | 4/1995 | Sartor et al. |
| 5,437,466 A | 8/1995 | Meibock et al. |
| 5,452,907 A | 9/1995 | Meibock et al. |
| 5,491,911 A | 2/1996 | Chen |
| 5,498,033 A | 3/1996 | Hoshizaki et al. |
| 5,505,467 A | 4/1996 | Hill et al. |
| 5,575,091 A | 11/1996 | Mattiuzzo |
| 5,596,820 A | 1/1997 | Edauw et al. |
| 5,662,338 A | 9/1997 | Steinhauser, Jr. |
| 5,694,703 A | 12/1997 | Diaz |
| 5,768,807 A | 6/1998 | Caeran et al. |
| 5,769,434 A | 6/1998 | Wurthner |
| 5,778,565 A | 7/1998 | Holt et al. |
| 5,779,246 A | 7/1998 | Bengtsson |
| 5,794,362 A | 8/1998 | Polk et al. |
| 5,799,955 A | 9/1998 | Iverson |
| 5,819,440 A | 10/1998 | Okajima |
| 5,822,887 A | 10/1998 | Turner |
| 5,839,736 A | 11/1998 | Chiu et al. |
| 5,875,566 A | 3/1999 | Bourdeau et al. |
| 5,887,361 A | 3/1999 | Cabanis et al. |
| 5,913,526 A | 6/1999 | Olson et al. |
| 5,926,978 A | 7/1999 | Smith |
| 5,926,979 A | 7/1999 | Borel |
| 5,933,986 A | 8/1999 | Donnadieu |
| 5,937,546 A | 8/1999 | Messmer |
| 5,966,843 A | 10/1999 | Sand et al. |
| 5,967,531 A | 10/1999 | Saillet |
| 5,971,405 A | 10/1999 | Edauw |
| 6,018,892 A | 2/2000 | Acheson et al. |
| 6,047,975 A | 4/2000 | Benoit et al. |
| 6,070,886 A | 6/2000 | Cornelius et al. |
| 6,070,887 A | 6/2000 | Cornelius et al. |
| 6,076,285 A | 6/2000 | Caeran et al. |
| 6,079,128 A | 6/2000 | Hoshizaki et al. |
| 6,102,881 A | 8/2000 | Quackenbush et al. |
| 6,105,280 A * | 8/2000 | Marcolin ............ A43B 3/0047 36/115 |
| 6,109,622 A | 8/2000 | Reynolds |
| 6,112,434 A | 9/2000 | Seltzer et al. |
| 6,120,038 A | 9/2000 | Dong et al. |
| 6,138,384 A | 10/2000 | Messmer |
| 6,139,030 A | 10/2000 | Meibock et al. |
| 6,152,459 A | 11/2000 | Meibock et al. |
| 6,168,172 B1 | 1/2001 | Meibock et al. |
| 6,217,036 B1 | 4/2001 | Rowledge |
| 6,223,457 B1 | 5/2001 | Graf |
| 6,254,110 B1 | 7/2001 | Meibock et al. |
| 6,260,290 B1 | 7/2001 | Chenevert |
| 6,293,564 B1 | 9/2001 | Gabrielli |
| 6,293,565 B1 | 9/2001 | Bouchard et al. |
| 6,295,679 B1 * | 10/2001 | Chenevert ............ A43B 3/26 12/142 P |
| 6,321,466 B1 | 11/2001 | Bordin et al. |
| D455,836 S | 4/2002 | Lammers |
| 6,364,321 B1 | 4/2002 | Steinhauser, Jr. |
| 6,367,818 B2 | 4/2002 | Meibock et al. |
| 6,371,494 B1 | 4/2002 | Bonaventure et al. |
| 6,374,516 B1 | 4/2002 | Bonaventure et al. |
| 6,381,877 B2 | 5/2002 | Filice |
| 6,419,241 B1 | 7/2002 | Chenevert |
| 6,505,422 B2 | 1/2003 | Racine |
| 6,519,877 B2 | 2/2003 | Oetting et al. |
| 6,533,295 B2 | 3/2003 | Gonthier |
| 6,550,159 B1 | 4/2003 | Madore |
| 6,557,864 B1 | 5/2003 | Lenoir |
| 6,601,042 B1 | 7/2003 | Lyden |
| 6,725,577 B2 | 4/2004 | Mazzarolo |
| 6,769,203 B1 * | 8/2004 | Wright ............ A43B 5/1666 36/115 |
| 6,935,054 B2 | 8/2005 | Hall et al. |
| 6,993,860 B2 | 2/2006 | Bettiol |
| 7,039,977 B2 | 5/2006 | Wilder |
| 7,082,703 B2 | 8/2006 | Greene et al. |
| 7,140,127 B2 | 11/2006 | Yang |
| 7,171,768 B2 | 2/2007 | Klein |
| 7,219,450 B2 | 5/2007 | Langley |
| 7,219,900 B2 | 5/2007 | Meibock |
| 7,290,355 B2 | 11/2007 | Labonte |
| 7,290,773 B2 | 11/2007 | Eck |

(56) References Cited

U.S. PATENT DOCUMENTS

| | | | |
|---|---|---|---|
| 7,325,813 B2 | 2/2008 | Bock | |
| RE40,363 E | 6/2008 | Grim et al. | |
| 7,380,354 B2 | 6/2008 | Yamashita | |
| 7,387,302 B2 | 6/2008 | Goldsmith | |
| 7,392,990 B2 | 7/2008 | Bussiere | |
| 7,398,609 B2 | 7/2008 | Labonte | |
| 7,451,991 B2 | 11/2008 | Labonte | |
| 7,533,479 B2 | 5/2009 | Labonte | |
| 7,562,881 B2 | 7/2009 | Crowder | |
| 7,712,173 B2 | 5/2010 | Labonte | |
| 7,770,930 B2 | 8/2010 | McLeod | |
| 7,793,947 B2 | 9/2010 | Labonte | |
| 7,806,418 B2 | 10/2010 | Labonte | |
| 7,896,363 B2 | 3/2011 | Lovejoy | |
| 7,908,771 B2 | 3/2011 | Foxen | |
| 7,950,676 B2* | 5/2011 | Goldsmith | A43B 5/1625 |
| | | | 280/11.12 |
| 8,109,536 B2 | 2/2012 | Labonte | |
| 8,302,329 B2 | 11/2012 | Hurd | |
| 8,353,535 B2 | 1/2013 | Salmon | |
| 8,387,286 B2 | 3/2013 | Koyess et al. | |
| 8,479,416 B2* | 7/2013 | Auger | A43B 7/1445 |
| | | | 36/102 |
| 8,684,368 B2 | 4/2014 | Van Horne | |
| 8,745,898 B2 | 6/2014 | Stewart | |
| 9,510,639 B2* | 12/2016 | Cruikshank | A43B 5/1625 |
| 9,554,615 B2 | 1/2017 | Labonte | |
| 9,878,229 B2* | 1/2018 | Lefebvre | A43B 5/1625 |
| 10,413,804 B2 | 9/2019 | Lefebvre | |
| 2001/0006282 A1 | 7/2001 | Green | |
| 2001/0022434 A1 | 9/2001 | Sauter | |
| 2001/0026054 A1 | 10/2001 | Olson | |
| 2002/0108272 A1* | 8/2002 | Parisotto | A43B 1/0027 |
| | | | 36/117.1 |
| 2003/0015848 A1 | 1/2003 | Pham | |
| 2003/0097769 A1 | 5/2003 | Gabrielli | |
| 2003/0102641 A1 | 6/2003 | Liu | |
| 2003/0115775 A1 | 6/2003 | Mazzarolo | |
| 2003/0115777 A1 | 6/2003 | Hall | |
| 2003/0193152 A1 | 10/2003 | Meibock | |
| 2003/0196351 A1 | 10/2003 | Hipp | |
| 2003/0204971 A1 | 11/2003 | Fauver | |
| 2004/0007836 A1 | 1/2004 | Sauter | |
| 2004/0016150 A1 | 1/2004 | Labonte | |
| 2004/0049950 A1 | 3/2004 | Van Horne | |
| 2004/0083625 A1 | 5/2004 | Wilder | |
| 2004/0090023 A1 | 5/2004 | Crowder | |
| 2004/0140631 A1 | 7/2004 | Goldsmith | |
| 2004/0168357 A1 | 9/2004 | Meibock | |
| 2004/0194350 A1 | 10/2004 | Mazzarolo | |
| 2004/0200099 A1 | 10/2004 | Chenevert | |
| 2004/0207164 A1 | 10/2004 | Meibock | |
| 2004/0226113 A1 | 11/2004 | Wright | |
| 2004/0261298 A1 | 12/2004 | Howard | |
| 2005/0116379 A1 | 6/2005 | Goldsmith et al. | |
| 2005/0126046 A1 | 6/2005 | Labonte | |
| 2005/0134010 A1 | 6/2005 | Blackenburg | |
| 2005/0144809 A1 | 7/2005 | Yang | |
| 2005/0193594 A1 | 9/2005 | Murphy | |
| 2005/0204585 A1 | 9/2005 | Loveridge et al. | |
| 2005/0217146 A1 | 10/2005 | Jones et al. | |
| 2005/0223604 A1 | 10/2005 | Neuner | |
| 2005/0229436 A1* | 10/2005 | Bock | A43B 5/1625 |
| | | | 36/115 |
| 2005/0267775 A1 | 12/2005 | Willis | |
| 2005/0273028 A1 | 12/2005 | Reynolds | |
| 2005/0280222 A1 | 12/2005 | Sauter | |
| 2006/0053662 A1* | 3/2006 | Yang | A43B 5/1625 |
| | | | 36/115 |
| 2006/0064904 A1 | 3/2006 | Confortin | |
| 2006/0145434 A1 | 7/2006 | Crowder | |
| 2006/0162192 A1* | 7/2006 | Roux | A43B 5/0482 |
| | | | 36/118.2 |
| 2006/0179686 A1 | 8/2006 | Labonte | |
| 2006/0179687 A1 | 8/2006 | Labonte | |
| 2006/0181035 A1 | 8/2006 | Labonte | |
| 2006/0181076 A1 | 8/2006 | Labonte | |
| 2006/0201030 A1 | 9/2006 | Wilder | |
| 2007/0013152 A1 | 1/2007 | Goldsmith | |
| 2007/0063457 A1 | 3/2007 | Labonte | |
| 2007/0186448 A1 | 8/2007 | Maibock | |
| 2008/0018066 A1 | 1/2008 | Pickford | |
| 2008/0150242 A1 | 6/2008 | Wurthner | |
| 2008/0172906 A1 | 7/2008 | Jou | |
| 2008/0238006 A1 | 10/2008 | Labonte | |
| 2009/0000151 A1 | 1/2009 | Cavasin | |
| 2009/0020967 A1 | 1/2009 | Weber | |
| 2009/0188056 A1 | 7/2009 | Labonte | |
| 2009/0243238 A1 | 10/2009 | Van Horne | |
| 2009/0289427 A1 | 11/2009 | Lovejoy | |
| 2010/0109312 A1 | 5/2010 | Salmon | |
| 2010/0156058 A1* | 6/2010 | Koyess | A43B 5/1616 |
| | | | 280/11.12 |
| 2010/0192412 A1 | 8/2010 | Stewart | |
| 2010/0275393 A1 | 11/2010 | Jou | |
| 2011/0016617 A1 | 1/2011 | Shrewsburg | |
| 2011/0101665 A1 | 5/2011 | Van Horne et al. | |
| 2012/0011742 A1 | 1/2012 | Yang | |
| 2012/0025478 A1 | 2/2012 | Van Horne et al. | |
| 2012/0144703 A1* | 6/2012 | Trinkaus | A43B 5/0427 |
| | | | 36/34 A |
| 2012/0167418 A1 | 7/2012 | Frappier | |
| 2012/0204452 A1* | 8/2012 | Van Horne | A43B 23/26 |
| | | | 36/115 |
| 2013/0119580 A1* | 5/2013 | Yang | B29C 45/14475 |
| | | | 264/279 |
| 2013/0214499 A1 | 8/2013 | Koyess | |
| 2014/0097583 A1* | 4/2014 | Vaughn | A63C 1/303 |
| | | | 280/11.12 |

FOREIGN PATENT DOCUMENTS

| | | |
|---|---|---|
| CA | 2497037 | 8/2006 |
| CA | 2750906 | 8/2006 |
| CA | 2726580 | 6/2012 |
| CA | 2801233 | 3/2013 |
| CA | 2834525 | 9/2014 |
| CA | 2845354 | 9/2014 |
| CA | 3024025 | 9/2014 |
| CH | 658795 | 12/1986 |
| EP | 2777417 | 9/2014 |
| FR | 2473280 | 7/1981 |
| FR | 2766065 | 1/1999 |
| FR | 2774563 | 8/1999 |
| WO | 2013137970 | 9/2013 |

OTHER PUBLICATIONS

European Search Report dated Jul. 24, 2014, in connection with European Patent Application EP 14158854.1, 8 pages.

Examiner's Report dated Apr. 22, 2013 in connection with Canadian Patent Application 2,801,233, 2 pages.

Examiner's Report dated Aug. 12, 2013, in connection with Canadian Patent Application 2,801,233, 2 pages.

Examiner's Report dated Apr. 26, 2021 in connection with Canadian Patent Application No. 3,055,740, 3 pages.

Examiner's Report dated Aug. 27, 2020 in connection with Canadian Patent Application No. 2,845,371, 3 pages.

Examiner's Report dated Dec. 10, 2018 in connection with Canadian Patent Application No. 2,834,525, 3 pages.

Examiner's Report dated Feb. 25, 2020 in connection with Canadian Patent Application No. 2,845,371, 4 pages.

Examiner's Report dated Jan. 8, 2019 in connection with Canadian Patent Application No. 3,024,025, 4 pages.

Examiner's Report dated Jul. 16, 2018 in connection with Canadian Patent Application No. 2,834,525, 3 pages.

Examiner's Report dated Mar. 11, 2021 in connection with Canadian Patent Application No. 2,845,371, 3 pages.

Examiner's Report dated Mar. 17, 2021 in connection with Canadian Patent application No. 3,050,394, 3 pages.

(56) References Cited

OTHER PUBLICATIONS

Examiner's Report dated Nov. 6, 2018 in connection with Canadian Patent Application No. 2,834,525, 4 pages.
Extended Search Report dated Jul. 25, 2014 in connection with European Patent Application No. 13194324.3, 7 pages.
Final Office Action dated Jan. 23, 2017 in connection with U.S. Appl. No. 14/094,599, 20 pages.
Final Office Action dated Feb. 25, 2016 in connection with U.S. Appl. No. 14/087,092, 18 pages.
Final Office Action dated Jul. 8, 2020 in connection with U.S. Appl. No. 16/262,509, 21 pages.
Final Office Action dated Mar. 21, 2016 in connection with U.S. Appl. No. 13/794,071, 18 pages.
Final Office Action dated Mar. 5, 2020 in connection with U.S. Appl. No. 16/262,509, 20 pages.
Non Final Office Action dated Aug. 19, 2019 in connection with U.S. Appl. No. 16/262,509, 42 pages.
Non-Final Office Action dated Aug. 1, 2016 in connection with U.S. Appl. No. 14/094,599, 14 pages.
Non-Final Office Action dated Feb. 14, 2019, in connection with U.S. Appl. No. 15/874,625, 16 pages.
Non-Final Office Action dated Mar. 8, 2021 in connection with U.S. Appl. No. 16/262,509, 26 pages.
Non-Final Office Action dated Oct. 8, 2015 in connection with U.S. Appl. No. 13/794,071, 12 pages.
Non-Final Office Action dated Sep. 25, 2015 in connection with U.S. Appl. No. 14/087,092, 17 pages.
Notice of Allowance dated Jun. 21, 2019 in connection with U.S. Appl. No. 15/874,625, 34 pages.
Notice of Allowance dated Oct. 6, 2017 in connection with U.S. Appl. No. 14/094,599, 12 pages.
Notice of Allowance dated Dec. 23, 2016 in connection with U.S. Appl. No. 14/087,092, 19 pages.
Notice of Allowance dated Nov. 8, 2016 in connection with U.S. Appl. No. 13/794,071, 3 pages.
Notice of Allowance dated Sep. 15, 2017 in connection with U.S. Appl. No. 14/094,599, 15 pages.
Restriction Requirement dated May 3, 2016 in connection with U.S. Appl. No. 14/094,599, 6 pages.
Written Opinion dated Sep. 12, 2014 in connection with International PCT application No. PCT/US2013/20763, 6 pages.
Bauer, Lil Champ toddler ice skates, Aug. 2013, 5 pages.
Bauer, Turbo Molded Hockey Skates, Aug. 2013, 3 pages.
CCM Champion 90 Ice Hockey Skates, Aug. 2013, 3 pages.
NHL Digest, KOR Hockey, Shift 2 model ice skates, NHL Digest product review dated Oct. 8, 2007, 6 pages.
Reinhardt, Five Popular Women's Ice Hockey Skates, Yahoo Contributor Network, Dec. 9, 2009. Retrieved from the Internet: http://voices.yahoo.com/five-popular-womens-ice-skates-2039696.html, 3 pages.

* cited by examiner

SKATE WITH INJECTED BOOT FORM

CROSS-REFERENCE TO RELATED APPLICATION

This application is a continuation of U.S. patent application Ser. No. 15/874,625, filed on Jan. 18, 2018 and issued to U.S. Pat. No. 10,413,804 on Sep. 17, 2019, which is a continuation of U.S. patent application Ser. No. 14/094,599, filed on Dec. 2, 2013 and issued to U.S. Pat. No. 9,878,229 on Jan. 30, 2018, which is a continuation in part of U.S. patent application Ser. No. 13/794,071 filed on Mar. 11, 2013 and issued to U.S. Pat. No. 9,510,639 on Dec. 6, 2016. The contents of the above-noted applications are incorporate herein by reference.

BACKGROUND

The boot portions of hockey skates typically are constructed of substantially rigid materials. While these rigid constructions generally provide a wearer with suitable protection against impacts from pucks, sticks, and the like, the lack of flexibility in the skate boots—particularly in the upper regions of the skate boots—tends to restrict movement and limits the motions a skater can execute. Further, it is difficult to stitch or otherwise attach many materials to these rigid constructions, thus limiting the design options available to a skate designer.

SUMMARY

A boot form for a hockey skate is made of multiple plastic materials having different hardness properties, or different flexural moduli, and is formed via an injection-molding process or another similar process. One or more of the plastic materials may be reinforced with fibers of glass, carbon, aramid, or another stiffening material to strengthen one or more regions of the boot form. For example, pellets of a first plastic material having a flexural modulus of approximately 190 MPa (e.g., a polyamide elastomer block amide) may be injected into a mold to form a softer upper region of the boot form. And pellets of a second plastic having a flexural modulus of approximately 20,000 MPa (e.g., a Nylon 12 with long glass fibers) may be injected into the mold to form a stiffer lower region of the boot form. A skate quarter and other skate components may then be attached to the boot form.

To achieve a different performance characteristic, a first plastic having a flexural modulus of approximately 2100 MPa (e.g., a Nylon 12 with short glass fibers) may be injected into the mold to form a softer upper region of the boot form. And pellets of a second plastic having a flexural modulus of approximately 4200 MPa (e.g., a Nylon 12 with a higher content of short glass fibers) may be injected into the mold to form a stiffer lower region of the boot form. A skate quarter and other skate components may then be attached to the boot form.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Figure 1:
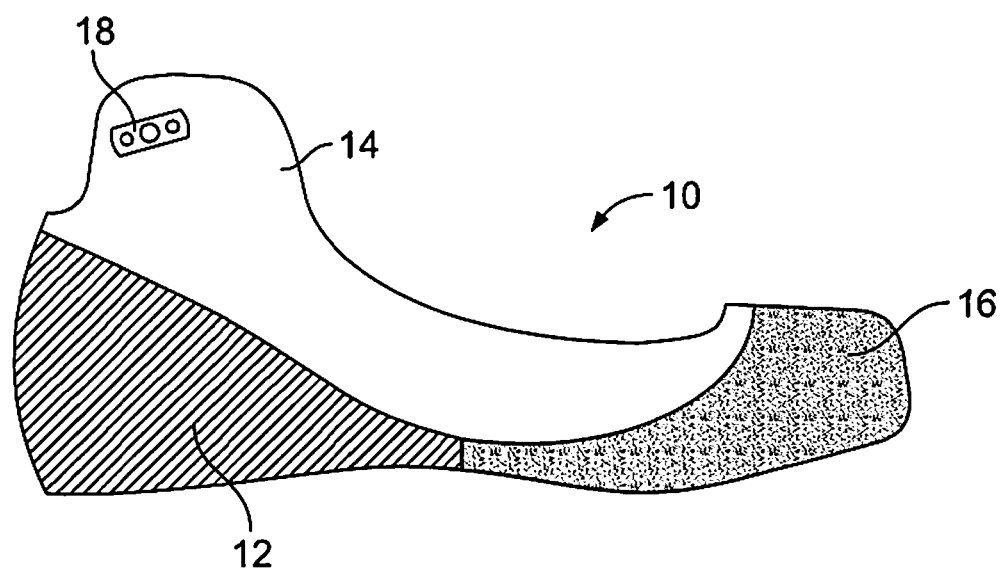
FIG. 1 is a perspective view of a boot form, according to one embodiment.
Figure 2:
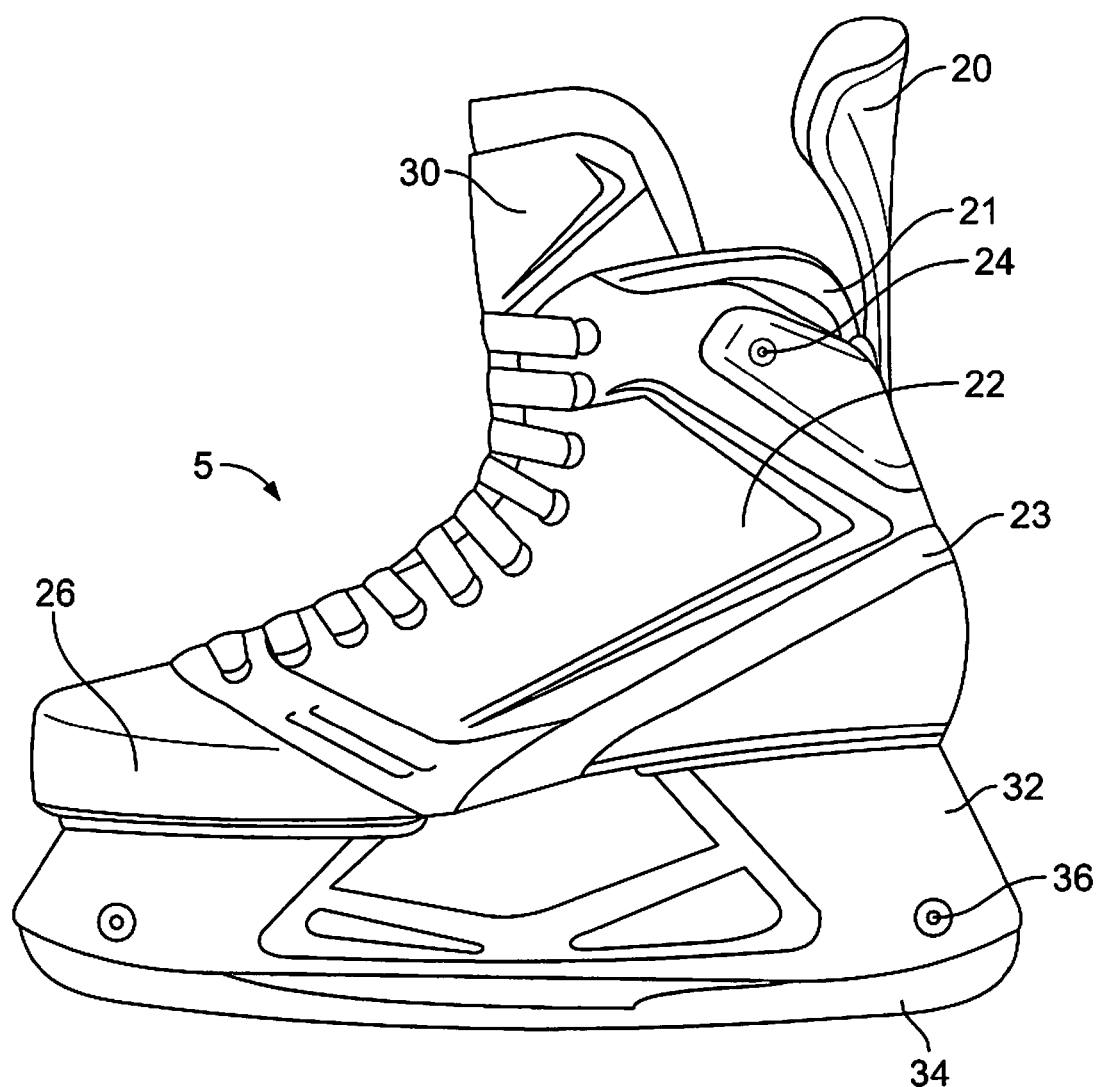
FIG. 2 is a perspective view of a hockey skate including the boot form shown in FIG. 1, according to one embodiment.

Turning now to FIGS. 1 and 2, a boot form 10 for a hockey skate 5 includes a rigid lower portion 12 and a less rigid upper portion 14. The upper portion 14 may be made of a thermoformable composite material, such as low density polyethylene, or of another material suitable for providing both structural support and relative flexibility in the upper portion 14. The lower portion 12 of the boot form 10 may be made of a rigid composite material, such as a carbon-fiber reinforced composite material, or of another suitable rigid material. The lower portion 12 of the boot form 10 may include an integral toe portion 16 made of the same material, or of a material having a similar rigidity, as the remainder of the lower portion 12. The various regions of the boot form 10 may be laid up and then cured together to form a unitary structure.

The boot form 10 may include multiple layers of material to yield an optimal flexibility for a given skate size. As the length and width of the skate 5 varies throughout the size ranges, the overall stiffness of the skate 5, if constructed in a uniform manner, also varies. A smaller-sized skate, for example, would have a greater stiffness than a similarly constructed larger-sized skate. Accordingly, the stiffness of the individual composite layers, particularly in the lower region 12 or the boot form 10, may be varied across different skate sizes to achieve a substantially equivalent skate stiffness or flexibility.

In one embodiment, the angles of the fibers in one or more layers of the boot form 10 may be adjusted based on the size of the skate 5. In skates having sizes 4 to 6.5, for example, the carbon or other fibers in the boot form 10 may be oriented to provide less relative stiffness than similarly situated fibers in skates having sizes 7-9.5, which may in turn have carbon or other fibers oriented to provide less relative stiffness than similarly situated fibers in skates having sizes 10 to 12.5. By varying the fiber angles in this manner, the overall flexion or torsional rigidity of the skate 5 can be substantially equalized throughout the available size ranges.

In one embodiment, the transition region between the upper portion 14 and the lower portion 12 of the boot form 10 is staggered during the layup process to provide a gradually changing flexibility along the length of the transition region. For example, the lower portion 12 of the boot form 10 may include one or more regions that extend upward beyond a neighboring region of the lower portion 12, or the lower portion 12 may include a stepped upper region providing a gradual increase or decrease in flexibility along the transition region. These arrangements may aid in the performance and durability of the skate 5.

Fastener elements 18 may be attached to or molded into the upper portion 14 of the boot form 10 to facilitate attachment of a tendon guard 20, a skate quarter 22, or other components. Screws 24, bolts, rivets, or other suitable fasteners may be used to engage the fastener elements 18 and to attach the components. In the illustrated embodiment, a portion of the skate quarter 22, as well as medial and lateral connecting portions of the tendon guard 20, are attached to the boot form 10 via screws 24 or similar connectors.

In one embodiment, two or more fastener elements 18 are included on each side of the boot form 10. As a result, the tendon guard 20 may be secured to multiple locations on each side of the boot form 10, thus preventing the tendon guard 20 from pivoting about the connection location. In another embodiment, stoppers 21 may additionally or alternatively be included at the upper regions of the skate boot to inhibit forward rotation of the tendon guard 20, as described, for example, in U.S. patent application Ser. No. 13/418,052, filed Mar. 12, 2012, which is incorporated herein by reference.

In one embodiment, a U-shaped notch or other opening is included in the rear of the skate boot to facilitate rearward extension of a wearer's ankle and lower leg during the skating motion. The tendon guard 20 may include a narrow mid-region to facilitate rearward flexing of the tendon guard 20, as described, for example, in U.S. patent application Ser. No. 13/271,029, filed Oct. 11, 2011, which is incorporated herein by reference.

The skate quarter 22 may be made of a thermoformable material, such as Surlyn®, high density polyethylene, or of another suitable material. Because the upper portion 14 of the boot form 10 is made of a thermoformable material or a similar material, the skate quarter 22 may be attached to the upper portion 14 of the boot form 10 via adhesives or stitching, as well as by the fasteners 18 described above. The use of a thermoformable upper portion 14 of the boot form 10, as well as a thermoformable skate quarter 22, facilitates conforming of the skate boot to the shape of a wearer's foot and ankle.

A molded protector 23 made of thermoplastic polyurethane, or of another suitable material, may be positioned over the lower edge of the skate quarter 22 to protect it from abrasion and from prying forces that could separate or delaminate the quarter 22 from the upper portion 14 of the boot form 10. Additionally, a molded toe cap 26 may be integral with or positioned over the integral toe portion 16 of the boot form 10. The toe cap 26 may be made of a plastic material, such as thermoplastic polyurethane, or of any other material suitable for providing protection to the toe region of the skate 5.

Figure 3:
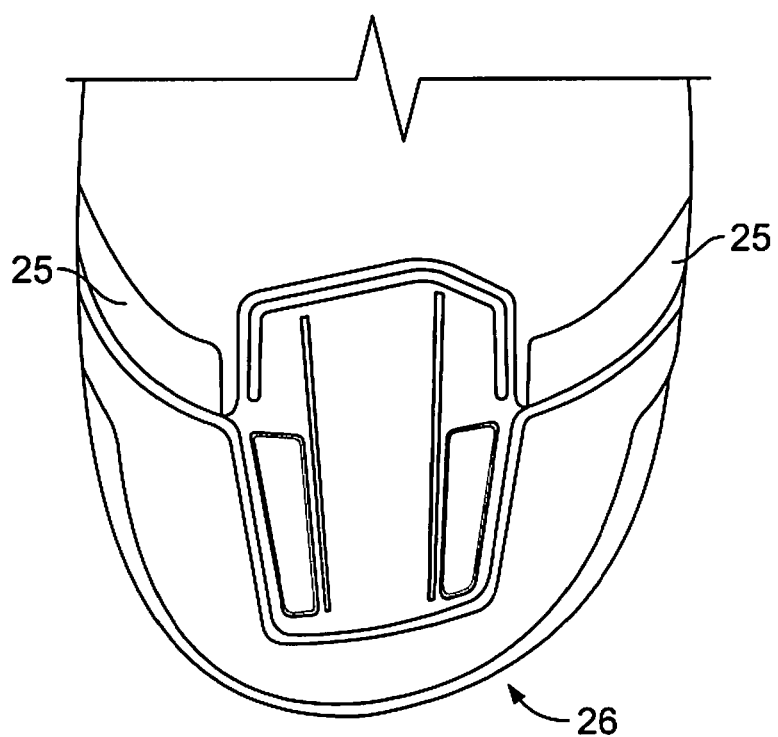
FIG. 3 is a perspective view of the toe cap of a skate boot, according to one embodiment.

As shown in FIG. 3, the toe cap 26 may include one or more flanges 25 or similar elements to which the skate quarter 22, the molded protector 23, or a skate tongue 30 may be attached. Connection of these components to the toe cap 26 may be advantageous, as it would be difficult to attach them directly to the rigid lower portion 12 of the boot form 10.

In one embodiment, the skate tongue 30 extends inside the toe region 16 of the boot form 10 to fill the space between the top of a wearer's foot and the upper, inner surface of the toe region 16. This arrangement provides comfort for the user, while also providing sensation and feedback during skating motions. In another embodiment, a separate filler element is positioned inside the toe region 16 adjacent to the end of the tongue 30 to provide similar benefits.

A blade holder 32 is attached to the lower portion 12 of the boot form 10 via screws, bolts, rivets, or other suitable connectors. The blade holder 32 may be made of DuPont Zytel® ST801 or of another suitable material. A blade 34 made of steel or of another suitable material is secured to the blade holder 32 via screws 36, rivets, bolts, or other suitable connectors. In one embodiment, the bottom of the boot form 10 includes a plurality of premolded openings to which the blade holder 32 is attached.

Multiple layers of material may be included on the interior region of the lower portion 12 of the boot form 10 to facilitate increased grip or holding strength of the screws or other connectors used to secure the blade holder 32 to the lower portion 12 of the boot form 10. Because the lower portion 12 of the boot form 10 is rigid, it does not readily accept connectors. Providing additional layers of material, however, increases the holding strength of the connectors. Additionally, the toe cap 26 preferably does not wrap underneath the toe region 16 so that it does not interfere with the attachment of the lower portion 12 of the boot form 10 to the blade holder 32.

The skate boot 5 described herein may be constructed by arranging in a mold the composite layers that make up the lower portion 12, upper portion 14, and toe region 16 of the boot form 10. As described above, the fiber angles in the given layers may be selected to provide the stiffness properties desired for a given skate size. Also as described above, the layers of the lower and upper portions 12, 14 of the boot form 10 optionally may be staggered to provide a graduated transition region between them.

Once the layers are arranged in the mold they are be cured under heat and pressure to create the boot form 10. The thermoformable upper portion 14 of the boot form 10 softens at a temperature range that does not affect the rigidity of the rigid lower portion 12 of the boot form 10. The upper portion 14, therefore, is able to conform to the shape of a wearer's foot and, after cooling, remain in that shape so that the skate 5 remains conformed to a wearer's foot. The skate quarter 22, toe cap 26, tongue 30, tendon guard 20, blade holder 32, and other skate components may then be attached to the boot form 10, or to each other, as described above.

Figure 4:
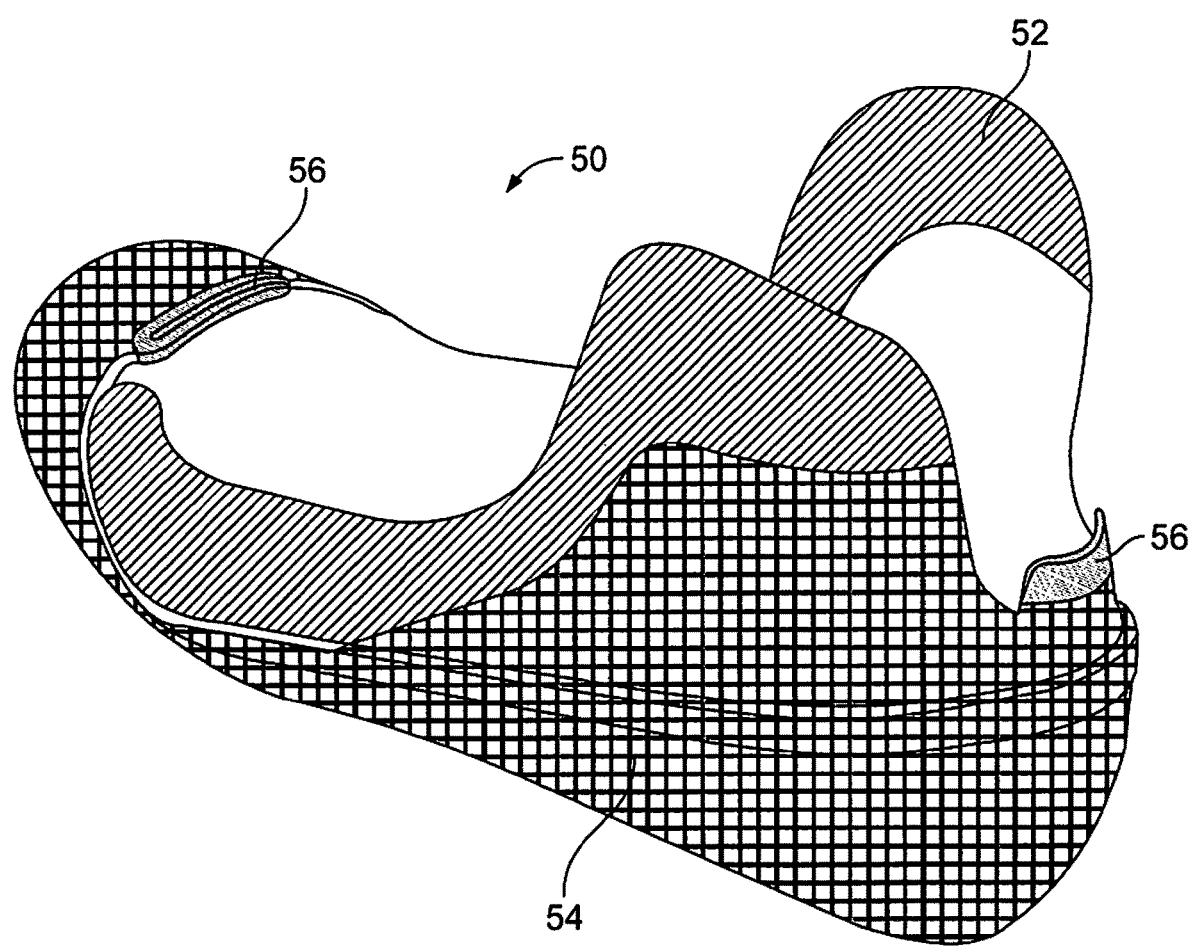
FIG. 4 s a perspective view of a boot form, according to another embodiment.

As illustrated in FIG. 4, in another embodiment, a boot form 50 may be made of multiple plastic materials having different hardness properties, or different flexural moduli, and may be formed via an injection-molding process or another similar process. One or more of the plastic materials may be reinforced with fibers of glass, carbon, aramid, or another stiffening material to strengthen one or more regions of the boot form 50. For example, pellets of a first plastic material having a flexural modulus of approximately 190 MPa (e.g., a polyamide elastomer block amide) may be injected into a mold to form the softer upper region 52 of the boot form. And pellets of a second plastic having a flexural modulus of approximately 20,000 MPa (e.g., a Nylon 12 with long glass fibers) may be injected into the mold to form the stiffer lower region 54 of the boot form.

To achieve a different performance characteristic, a first plastic having a flexural modulus of approximately 2100 MPa (e.g., a Nylon 12 with short glass fibers) may be injected into the mold to form a softer upper region of the boot form. And pellets of a second plastic having a flexural modulus of approximately 4200 MPa (e.g., a Nylon 12 with a higher content of short glass fibers) may be injected into the mold to form a stiffer lower region of the boot form. A skate quarter and other skate components may then be attached to the boot form.

The second plastic material preferably bonds with the first plastic material during heating and curing in the mold but could otherwise be attached in another suitable manner. If desired, a smaller amount of the stiffer, second plastic material may be introduced into the upper region 52 of the boot form 50 to increase the stiffness of the upper region 52 relative to a boot form including only the first plastic material in the upper region.

The use of different plastics having different flexural moduli facilitates customization of the boot form 50 to meet the preferences of a variety of users. For example, some users may prefer a very flexible upper region 52, while others may prefer an upper region 52 that, while more flexible than the lower region 54, is relatively close in stiffness to the lower region 54. In one embodiment, the upper region 52 of the boot form 50 is formed from a plastic material that is soft enough to receive stitches, such that a skate quarter or other elements of the skate may be stitched to the upper region 52.

In one embodiment, one or more flexible flanges or tabs 56 may be molded to, or otherwise attached to, one or more regions of the boot form 50. Components of a hockey skate may be attached to the tabs 56 via stitching, adhesive, or another suitable connector. For example, a flexible tab 56 may be molded or otherwise connected to the toe region of the boot form 50 for connection to a tongue of the skate. A flexible tab 56 may additionally or alternatively be molded or otherwise connected to the rear of the boot form for attachment to an inner liner of the skate boot or attachment to a tendon guard. Attaching a tendon guard to the flexible tab 56, for example, allows the tendon guard to flex rearward and forward via movement of the tab 56. Accordingly, the tendon guard may be made of a relatively stiff material to enhance protection, while still allowing the user to maximize range of leg motion in the rearward and forward directions due to the flexibility of the tab 56.

Once the boot form 50 is formed, a skate quarter, toe cap, tongue, tendon guard, blade holder, or other skate components may be attached to the boot form 50, or to each other, as described in the above embodiments. In one embodiment, a fabric layer or a composite-fiber layer may be positioned in the mold to enhance bonding of the injected pellets when they melt such that they from an integral boot form with excellent impact resistance properties. In another embodiment, a toe cap or heel cup having a different flexural modulus than the boot form itself may be separately injected and then placed in the mold to bond with the boot form during the subsequent injection process to provide increased impact protection.

Any of the above-described embodiments may be used alone or in combination with one another. Further, the hockey skate may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. A skate comprising:
a boot form configured to receive a foot of a user and including a plurality of different materials, the boot form comprising a lateral side region and a medial side region respectively configured to face a lateral side and a medial side of the user's foot, an ankle region configured to face an ankle of the user, a heel region configured to face a heel of the user's foot, and a U-shaped notch that extends between the lateral side region and the medial side region of the boot form towards the heel region of the boot form to facilitate rearward extension of the ankle of the user during skating, the lateral side region, the medial side region, the ankle region, and the heel region of the boot form being molded integrally with one another from the different materials, the boot form comprising a lower portion including a first one of the different materials and an upper portion including a second one of the different materials and molded with the lower portion of the boot form, a lower part of the U-shaped notch including the first one of the different materials and an upper part of the U-shaped notch including the second one of the different materials; and
a skating device below the boot form.

2. The skate of claim 1, wherein a periphery of the U-shaped notch includes respective ones of the different materials.

3. The skate of claim 2, wherein: the periphery of the U-shaped notch comprises a medial edge, a lateral edge and a bottom edge; and the bottom edge of the U-shaped notch includes the first one of the different materials and at least one of the medial edge and the lateral edge of the U-shaped notch includes the second one of the different materials.

4. The skate of claim 1, wherein the different materials differ in flexibility.

5. The hockey skate of claim 1, wherein the different materials are different composite materials.

6. The skate of claim 1, wherein a flexibility of the second one of the different materials is greater than a flexibility of the first one of the different materials such that the upper portion of the boot form is less rigid than the lower portion of the boot form.

7. The skate of claim 6, wherein the lower portion of the boot form comprises an uppermost point and wherein a bottom edge of the U-shaped notch is lower in a heightwise direction of the skate than the uppermost point of the lower portion of the boot form.

8. The skate of claim 6, wherein the first one of the different materials has a flexural modulus of about 4200 MPa, and the second one of the different materials has a flexural modulus of about 2100 MPa.

9. The skate of claim 6, wherein the first one of the different materials has a flexural modulus of about 20,000 MPa, and the second one of the different materials has a flexural modulus of about 190 MPa.

10. The skate of claim 1, wherein the second one of the different materials is more flexible than the first one of the different materials such that that upper part of the U-shaped notch is less rigid than the lower part of the U-shaped notch.

11. The skate of claim 1, wherein the boot form comprises a toe region configured to enclosed toes of the user's foot and integrally formed with the lateral side region and the medial side region of the boot form.

12. The skate of claim 11, comprising a flexible tab molded to the toe region of the boot form, and a tongue attached to the flexible tab.

13. The skate of claim 1, wherein the boot form comprises a sole region configured to face a plantar surface of the user's foot and integrally formed with the lateral side region and the medial side region of the boot form.

14. The skate of claim 13, wherein the boot form comprises a sole region configured to face a plantar surface of the user's foot and integrally formed with the lateral side region and the medial side region of the boot form.

15. The skate of claim 1, comprising a flexible tab molded to a rear region of the boot form, and a tendon guard attached to the flexible tab.

16. The skate of claim 1, comprising flexible tab molded to a rear region of the boot form.

17. The skate of claim 16, wherein the flexible tab defines at least part of the bottom edge of the U-shaped notch.

18. The skate of claim 1, wherein the first one of the different materials of the boot form comprises fibers selected from a group consisting of carbon, glass, and aramid fibers.

19. The skate of claim 1, wherein the skating device comprises a blade holder attached to a bottom of the boot form.

20. A skate comprising:
a boot form configured to receive a foot of a user and including a plurality of different materials, the boot form comprising a lateral side region and a medial side region respectively configured to face a lateral side and a medial side of the user's foot, an ankle region configured to face an ankle of the user, a heel region configured to face a heel of the user's foot, and a U-shaped notch that extends between the lateral side region and the medial side region of the boot form towards the heel region of the boot form to facilitate rearward extension of the ankle of the user during skating, the lateral side region, the medial side region, the ankle region, and the heel region of the boot form being molded integrally with one another from the different materials, the boot form comprising a lower portion including a first one of the different materials and an upper portion including a second one of the different materials and molded with the lower portion of the boot form, a periphery of the U-shaped notch including respective ones of the different materials such that an upper part of the U-shaped notch is more flexible than a lower part of the U-shaped notch; and
a skating device below the boot form.

* * * * *